United States Patent [19]
Tokumitsu et al.

[11] 4,353,617
[45] Oct. 12, 1982

[54] OPTICAL SYSTEM CAPABLE OF CONTINUOUSLY VARYING THE DIAMETER OF A BEAM SPOT

[75] Inventors: Jun Tokumitsu, Kawasaki; Kazuo Minoura, Yokohama, both of Japan

[73] Assignee: Canon Kabushiki Kaisha, Tokyo, Japan

[21] Appl. No.: 208,038

[22] Filed: Nov. 18, 1980

[51] Int. Cl.³ .................. G02B 27/17; G02B 15/16
[52] U.S. Cl. .................................. 350/6.8; 350/427
[58] Field of Search ............ 350/6.8, 6.7, 6.3, 212, 350/225, 234, 20, 25, 40, 1.3, 427; 358/199

[56] References Cited
U.S. PATENT DOCUMENTS

| | | | |
|---|---|---|---|
| 3,259,013 | 7/1966 | Back | 350/423 |
| 3,790,255 | 2/1974 | Shoemaker | 350/427 |
| 4,128,297 | 12/1978 | Bourne | 350/6.1 |
| 4,253,724 | 3/1981 | Minoura et al. | 350/6.8 |

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

An optical system having a light source portion, a light receiving medium receiving the light beam from the light source portion, and a light condensing optical system for condensing the light beam from the light source portion as a beam spot on the light receiving medium, the light condensing optical system having provided therein an area in which the light beam becomes a parallel beam, said area having disposed therein an afocal zoom lens, whereby the diameter of the beam spot can be continuously varied.

6 Claims, 18 Drawing Figures

——— 0.85μ
—·—·— 0.6328μ

——— 0.85μ
——·— 0.6328μ

———— 0.85μ
—·—·— 0.6328μ

OPTICAL SYSTEM CAPABLE OF CONTINUOUSLY VARYING THE DIAMETER OF A BEAM SPOT

BACKGROUND OF THE INVENTION

1. Field of the Invention

This invention relates to an optical system capable of continuously varying the diameter of a beam spot condensed on a light receiving part, and more particularly to an optical system which is applicable to a scanning optical system for scanning a light beam to scan a photosensitive medium, or an optical system for optically reading information from an information accumulating member.

2. Description of the Prior Art

Generally, in a scanning optical system such as a laser optical system or the like, a beam expander of fixed magnification is used to obtain a desired beam diameter. However, where various scanning optical systems having necessary different beam diameters exist, a single beam expander of fixed magnification cannot be used with all of these scanning optical systems, but beam expanders corresponding to the beam diameters required in the respective optical systems must be manufactured. For example, in case of the experimentation with and examination of recording apparatus using lasers which have been actively developed in the recent years, the specification differs from one recording apparatus to another with respect to the beam diameter required and therefore, it is necessary to manufacture a number of beam expanders. Therefore, to alleviate such cumbersomeness, an afocal zoom lens has been desired which can continuously vary the diameter of the scanning beam.

Heretofore, 8 mm camera zoom lenses have been known as optical systems which continuously vary the diameter of an incident parallel beam and cause the beam to emerge as a parallel beam. As an example, the zoom lens disclosed in U.S. Pat. No. 3,679,292 comprises four lens groups. In this zoom lens, the magnification changing area includes the equal magnification intermediately thereof for that purpose, and has no diffraction limit performance.

As another example of the afocal zoom lens, there is an optical system having the magnification changing portion of the ultratelephoto lens disclosed in Japanese Patent Publication No. 24295/1974. This magnification changing portion comprises three lens groups and for the purpose of use thereof, the magnification changing area thereof includes the equal magnification intermediately thereof, and has no diffraction limit performance.

As still another example of the afocal zoom lens, there is a long wave infrared ray afocal zoom telescope disclosed in U.S. Pat. No. 3,947,084. This is a zoom lens for use in an infrared ray radar apparatus and video apparatus, and comprises four lens groups.

The above-described afocal zoom lens systems are lens systems in which, for the purpose of use thereof, the magnification changing area includes the equal magnification in the intermediate portion thereof, and each lens group forming the lens system assumes a complicated construction to eliminate the various aberrations characteristic in usual photography of an object.

SUMMARY OF THE INVENTION

It is an object of the present invention to provide an optical system which uses the light beam from a light source portion as a beam spot and which is provided with an afocal zoom lens capable of continuously varying the diameter of the beam spot.

It is another object of the present invention to provide an optical system in which, even if the diameter of the beam spot is continuously varied, the performance of the spot beam satisfies the diffraction limit performance for the use. For example, an optical system may be provided with an afocal zoom expander having the diffraction limit performance for the use of an He-Ne laser or a semiconductor laser where the afocal zoom lens is a beam expander having zooming from equal magnification to the order of 10 times.

It is still another object of the present invention to provide an optical system provided with an afocal zoom lens which is simple in construction and in which aberrations have been well corrected.

In the optical system of the present invention which is capable of continuously varying a beam spot, an area in which the light beam from the light source portion becomes a parallel beam is provided at least one place in the optical system, and an afocal zoom lens for continuously varying the diameter of the light beam is disposed in said area. To achieve the abovenoted objects, this afocal zoom lens comprises three lens groups, two of which may be moved to thereby vary the diameter of the parallel beam. By varying the diameter of this parallel beam, the shape of the beam spot condensed on a light receiving medium can remain the same.

Where the light beam from the light source is used as the beam spot as in the present invention, unlike the conventional imaged condition as a photographic object, the performance of the beam spot should only exist within the diffraction limit in case of magnification change and also, as regards aberration, the spherical aberration which is the on-axial aberration, or the chromatic aberration should be well corrected. For this purpose, in the present invention, the afocal zoom lens is constituted by three lens groups, two of which are movable during zooming. Further, the three lens are disposed in the order of positive, negative and positive or negative, positive and negative as a compact power arrangement which facilitates the aberration correction.

Further, in the optical system according to the present invention, the afocal zoom lens may be constituted by a cylindrical lens, whereby the shape of the spot can be lengthened or shortened in a particular direction by the magnification effect for one direction. When a semiconductor laser is used as the laser, it has been practised to shape the beam into a circular form or the like by using a cylindrical lens because the light beam emitted from the semiconductor laser has different angles of extent in the longitudinal direction and the lateral direction. However, if the semiconductor laser used is changed variously, the ratio between the angles of extent of the emitted light beam in the longitudinal direction and the lateral direction becomes different due to the difference in specification between semiconductor lasers or to the irregularity between the elements of the semiconductor lasers. Each time the semiconductor laser is changed, the optical system for effecting suitable beam shaping must be newly reset. Even in such a case, if beam shaping is effected by an afocal zoom lens comprising a cylindrical lens, the optical system need not be changed and, if the amount of magnification change is suitably varied in accordance with the semiconductor laser used, desired beam shaping can always be accomplished.

The invention will become more fully apparent from the following detailed description thereof taken in conjunction with the accompanying drawings.

DESCRIPTION OF THE PREFERRED EMBODIMENTS

Description will first be made of an afocal zoom lens which is applied to the optical system of the present invention. In an afocal zoom lens, a three-group construction is the minimum construction. That is, an afocal zoom lens cannot be realized by one group, of course, and even if it is realized by two groups, it is possible to make an afocal system of a fixed magnification by making the image point of a first group (the object point of a second group) coincident with the forward focus of the second group but it is not possible to endow the afocal system with a zooming function. However, if an afocal zoom lens is made into a three-group construction, the image forming magnification of a second group can be varied by changing the position of the second group with respect to the image point of a first group (the object point of the second group) and accordingly, the image side effective F-number of the second group can be varied. Further if the image point of the second group (the object point of a third group) is made coincident with the forward focus of the third group, the system is kept afocal and at the same time, the diameter of the emergent beam can be varied by the variation in F-number of the third group resulting from the variation in the image side effective F-number of the second group.

Figure 1A:
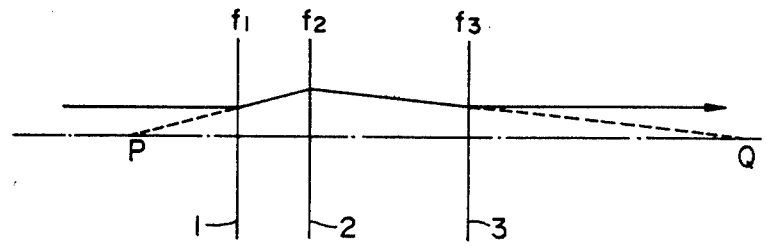
FIGS. 1A and B and FIGS. 2A, B and C diagrammatically illustrate an afocal zoom expander which is a form of the afocal zoom lens used in the optical system according to the present invention.
Figure 1B:
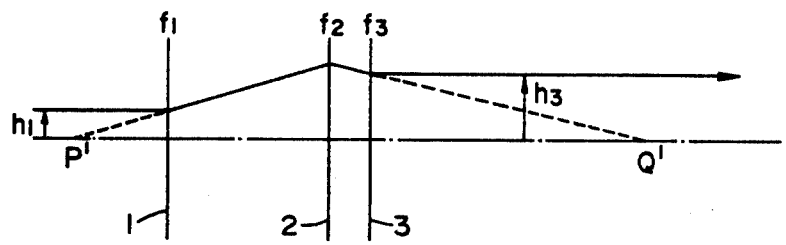

This will be explained by reference to the example of FIGS. 1A and 1B, in which a second group 2 is a fixed group, and a first group 1 and a third group 3 are movable groups (one of which is usually called a variator and the other is usually called a compensator). In FIG. 1A, it is assumed that the system constitutes an afocal system having a certain magnification. A point P is the image point of the first group, namely, the rearward focus of the first group, and the object point of the second group. The image point Q of the second group is made coincident with the forward focus of the third group. In order to effect the zooming from this state, it is assumed that the first group has been moved as shown in FIG. 1B and the object point of the second group has shifted to P'. Correspondingly, the image point of the second group shifts to Q'. If it is assumed that the first group has been moved by S (rightward movement is the positive amount and leftward movement is the negative amount) from its initial position, the image forming magnification $\beta_2(S)$ of the second group becomes as shown by the following equation:

$$\beta_2(S) = \frac{\phi_1}{\phi_1 + \phi_2 - (e'_1 - S)\phi_1\phi_2} \qquad (1)$$

where $\phi_1$ and $\phi_2$ are the refractive powers of the first group and the second group, respectively, and $e'_1$ is the interval between the principal points of the first and second groups in their initial position.

If, by the movement of the first group, the image forming magnification of the second group is varied as shown by equation (1), the image side effective F-number of the second group is varied. Further, if the forward focus of the third group is made coincident with Q', the system is kept afocal. At this time, the amount of necessary movement (like S, rightward movement is the positive amount and leftward movement is the negative amount) of the third group is:

$$t = \frac{1 - (e'_1 - S)\phi_1}{\phi_1 + \phi_2 - (e'_1 - S)\phi_1\phi_2} + \frac{1}{\phi_3} - e'_2 \qquad (2)$$

where $\phi_3$ is the refractive power of the third group, and $e'_2$ is the interval between the principal points of the second and third groups in their initial position.

If the image side effective F-number of the second group varies, the F-number of the third group also varies and the diameter of the emergent beam varies. If, as shown in FIG. 1B, the incidence height of parallel incident light rays is $h_1$ and the emergence height of parallel emergent light rays is $h_3$, the beam diameter magnification is $h_3/h_1$ and if this is represented by Z, Z has the following relation with the image forming magnification $\beta_2(S)$ of the second group.

$$Z = -\frac{\phi_1}{\phi_3}\beta_2(S) \qquad (3)$$

That is, if constituted by three groups, an afocal zoom lens can be realized.

The constructions of the three groups are positive, negative and positive or negative, positive and negative. Other constructions would also occur to mind, but where the beam diameter is varied from equal magnification, particularly, where the beam diameter is used in the enlarging direction, these two types of construction are convenient. This is because, if it is desired to vary the light beam diameter from equal magnification in constructions other than positive, negative and positive or negative, positive and negative, for example, in the case of positive, positive and positive constructions, the laser beam must once be imaged in the lens system, the refractive power of the lens becomes strong and the amount of aberrations produced becomes great if it is desired to weaken the refractive power of the lens, the full length of the system becomes great and because, in the case of positive, positive and negative or other constructions, the interval between the groups must be 0 or less and it becomes necessary to place the principal point outside of the lens. It therefore becomes difficult to realize an afocal zoom lens.

Figure 2A:
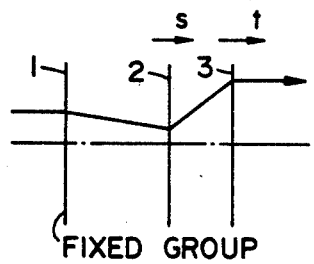
Figure 2B:
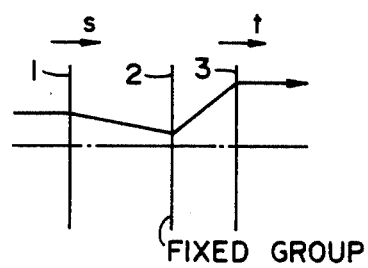
Figure 2C:
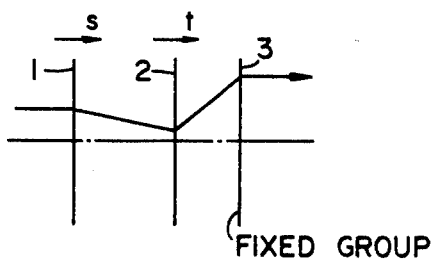
Figure 3A:
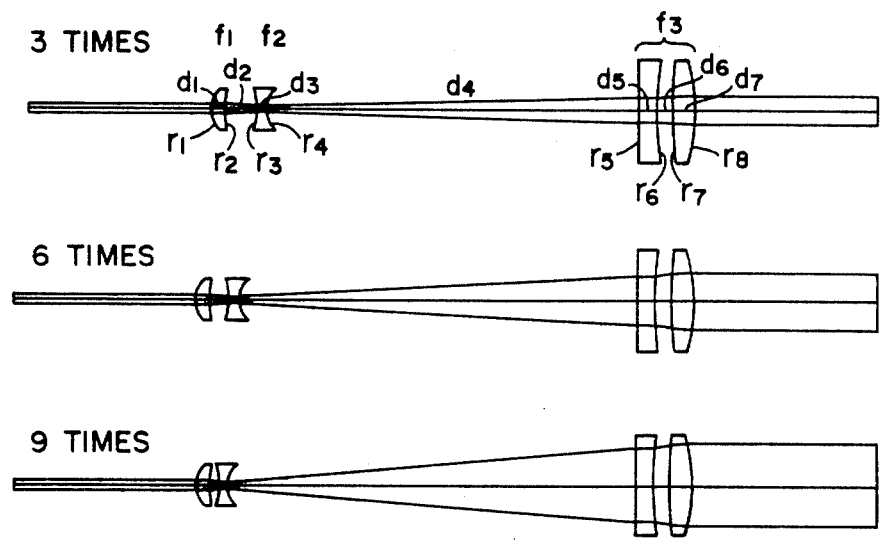
FIGS. 3A and B, FIGS. 4A and B, FIGS. 5A and B, FIGS. 6A and B and FIGS. 7A and B respectively diagrammatically show embodiments of the afocal zoom expander applied to the optical system according to the present invention.
Figure 3B:
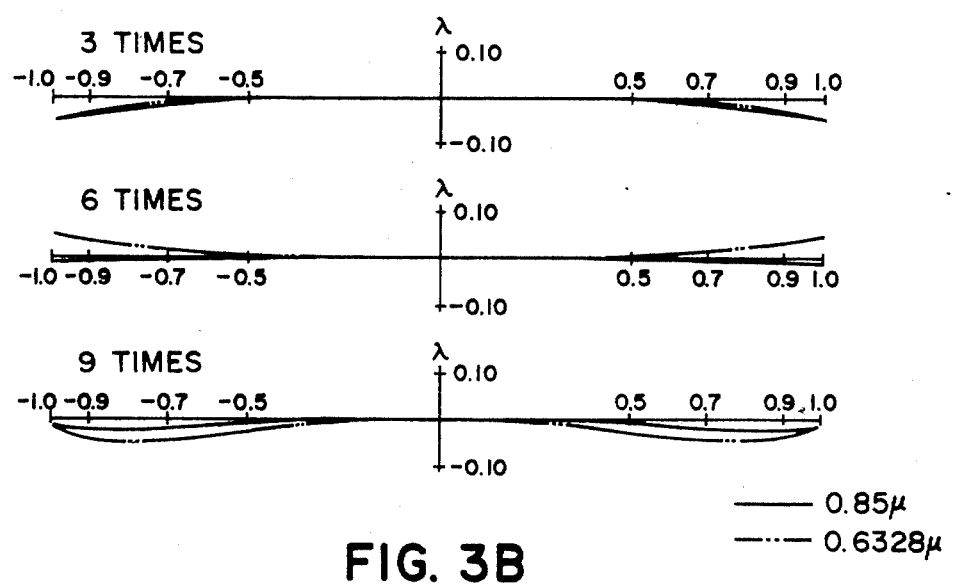
Figure 4A:
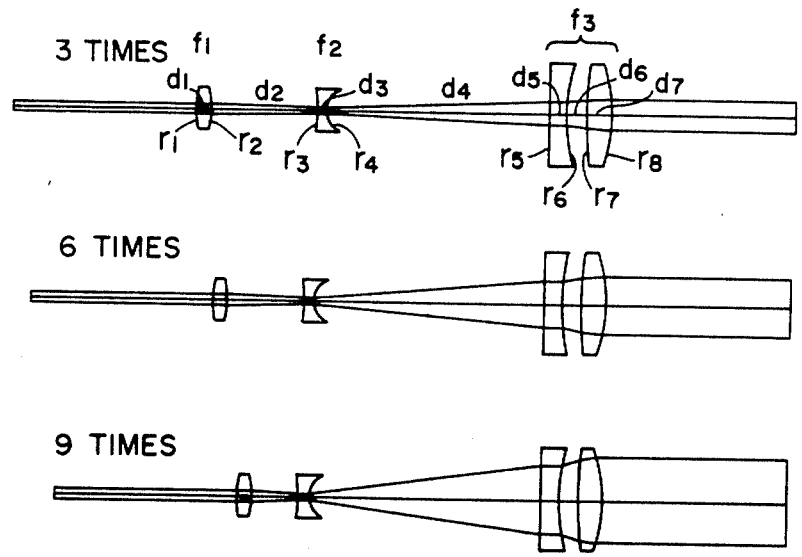
Figure 4B:
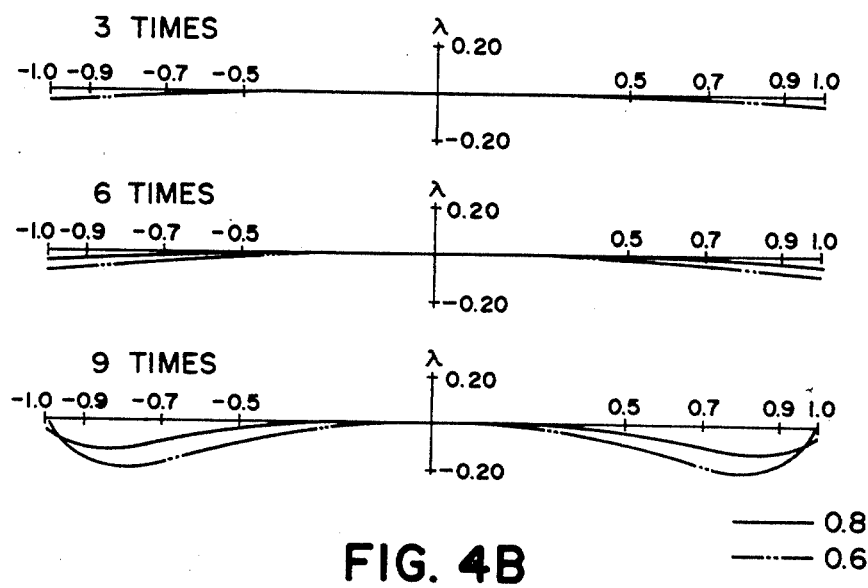
Figure 5A:
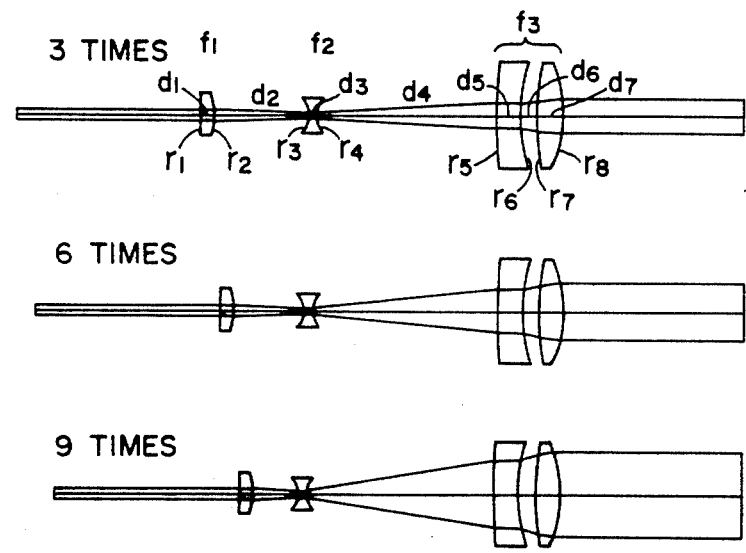
Figure 5B:
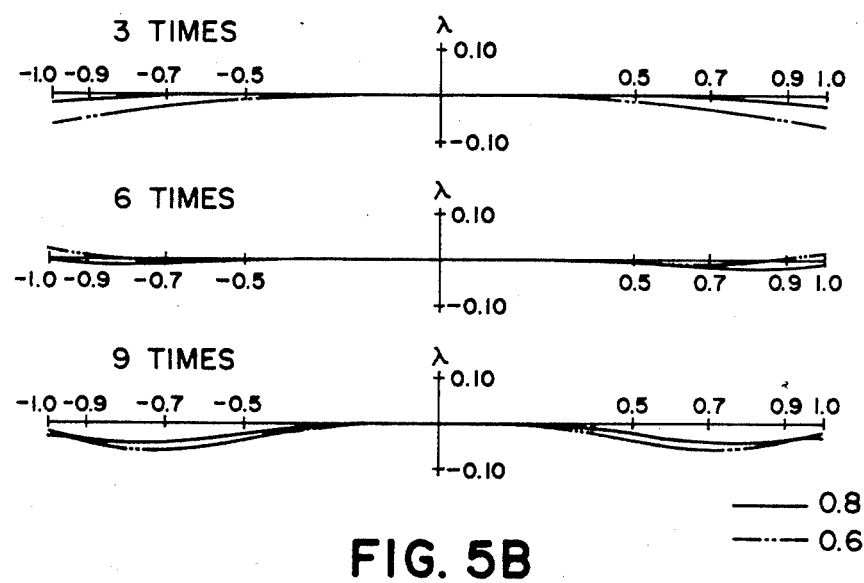
Figure 6A:
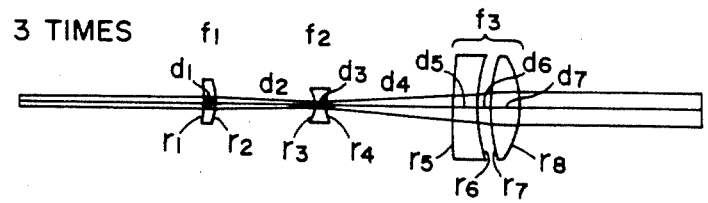
Figure 6A:
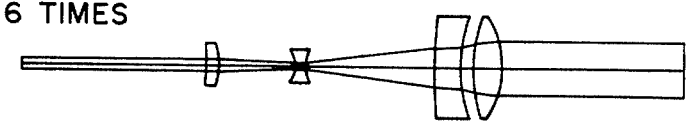
Figure 6A:
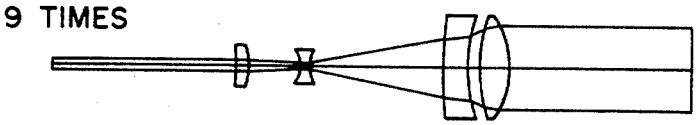
Figure 6B:
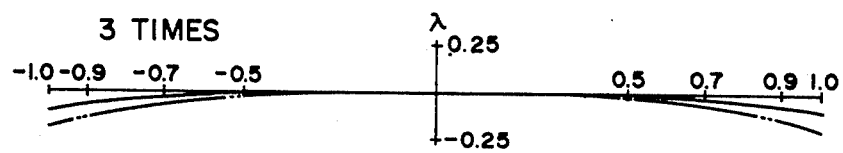
Figure 6B:
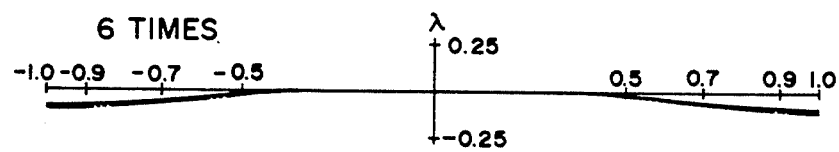
Figure 6B:
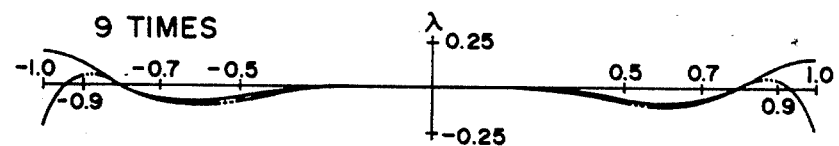
Figure 7A:
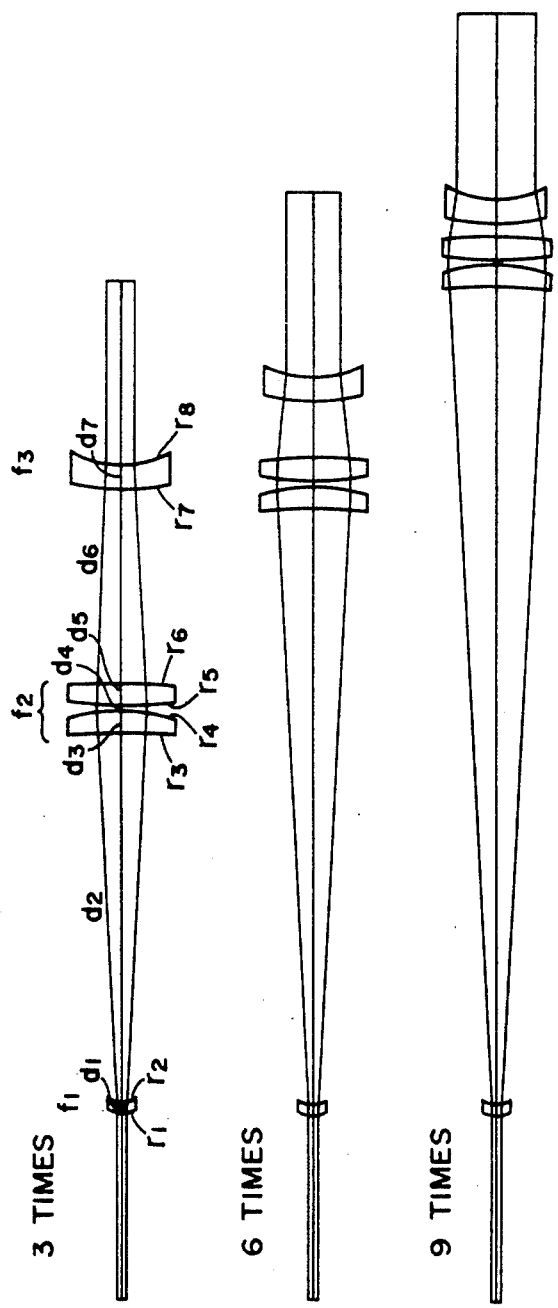
Figure 7B:
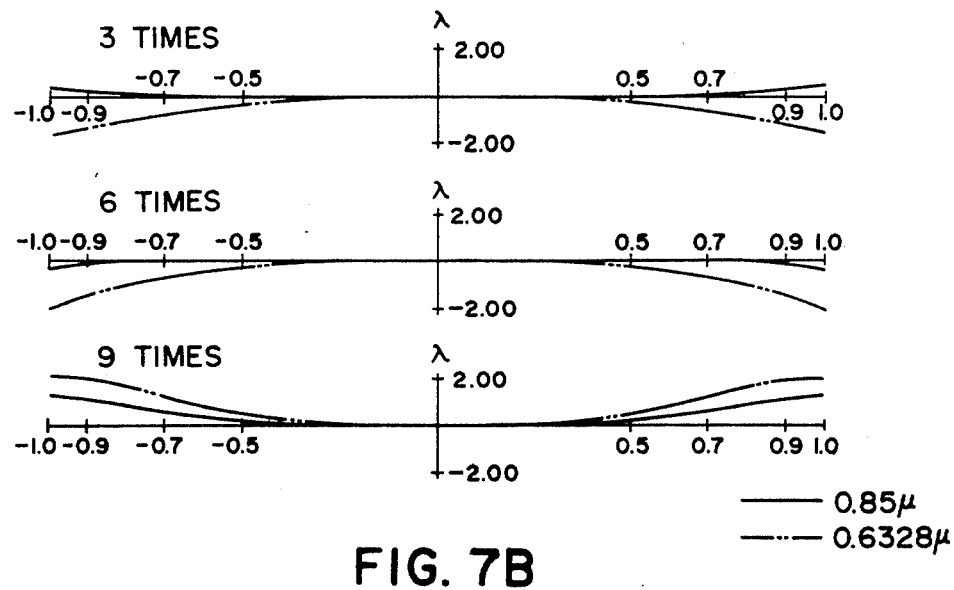

The following six zoom types of the three-group afocal zoom lens are conceivable. From the fact that two of the three groups must be movable groups and one group must be a fixed group, the zoom type is divided into three types depending on which of the three groups is made into a fixed group. FIGS. 2A, B and C are schematic views of zoom expanders which are a form of afocal zoom lens when the first, the second and the third group are respectively made into a fixed group. These three zoom types are further divided into two types, respectively, depending on which of the two movable groups is selected as a variator or a compensator and thus, there are total six zoom types.

These six zoom types have interchangeability therebetween because of the fact that they form an afocal system as the optical condition of a predetermined magnification and the entire lens system of a certain zoom type can be spatially moved to thereby make it attributable to a refractive power arrangement of other zoom type. Accordingly, by devising any one type as the zoom type, it is usually possible to realize six zoom types after all.

In order to make a compact lens in which aberrations have been well corrected, an appropriate refractive power arrangement is necessary. When the refractive power arrangement of positive, negative and positive is compared with that of negative, positive and negative, the latter has a tendency to have a greater full length than the former.

Description will first be made of a lens system having a refractive power arrangement of positive, negative and positive. As an aberration to be corrected, chromatic aberration may be considered and as an aberration for monochromatic light, spherical aberration may be considered in view of the fact that the on-axial ray is the object.

It is to be understood that the refractive power of each group satisfies the following conditions.

$$|\phi_1| < 0.055 \qquad (4)$$

$$|\phi_2| < 0.34 \qquad (5)$$

$$|\phi_3| < 0.02 \qquad (6)$$

Condition (4) is for bringing about such a refractive power arrangement that the entire system becomes compact when conditions (5) and (6) have been set. Condition (5) represents the refractive power which can be made by a single lens and, if the absolute value of the refractive power exceeds this condition, the manufacture will become difficult. Condition (6) is concerned with the correction of aberrations.

In the third group, the height of the incident light ray becomes greatest and the height is greatly varied with zooming and therefore, the third group is the most important group for the correction of aberrations. It is therefore important to render the F-number value of the third group greater than a predetermined value. The F-number value of the third group becomes minimum when the magnification of the beam diameter is ten times, namely, when the emergence height of the emergent light ray becomes greatest. Condition (6) is a condition having a relation which keeps the then F-number value at 2.5 or greater for a light ray having an incidence height of 1.0, for example. It is to be understood that more preferably, the refractive power of each group, the interval between the principal points and the full length satisfy the following conditions:

$$0.027 < \phi_1 < 0.055 \qquad (7)$$

$$-0.34 < \phi_2 < -0.18 \qquad (8)$$

$$0.0087 < \phi_3 < 0.02 \qquad (9)$$

$$12.0 < e_1' < 30.0 \qquad (10)$$

$$42.0 < e_2' < 75.0 \qquad (11)$$

$$71.0 < l < 111.0 \qquad (12)$$

where $l$ is the maximum value of the lens length in the entire magnification change range. Condition (7), coupled with conditions (8) to (11), is for making the full length compact. Condition (8) is for making the full length compact in the range in which the lens can be manufactured and, if the upper limit value of this condition is exceeded, the full length will become too great and, if the lower limit value of this condition is exceeded, the manufacture will become difficult for a single lens. Condition (9) is for correcting the aberrations and making the entire system compact and, if the upper limit value of this condition is exceeded, the F-number value of the third group will become too small to correct the aberrations and, if the lower limit value of this condition is not exceeded, the full length will become too great to make the system compact. Conditions (10) and (11) are for correcting the aberrations and making the entire system compact. Condition (12) is for making the entire system compact in the range in which correction of the aberrations is possible. If the upper limit value of this condition is exceeded, the entire system will not become compact and, if the lower limit value of this condition is not exceeded, the refractive power of each group will unavoidably be made strong and elimination of the aberrations will become impossible.

It is to be understood that the third group is further made into the following construction for the purpose of good aberration correction. It is also to be understood that the third group comprises two single lenses having a positive refractive power and a negative refractive power, respectively. It is further to be understood that there is established $$\nu_3^+ > \nu_3^- \qquad (13)$$

where $\nu_3^+$ is the value of the dispersive power of the lens having a positive refractive power and $\nu_3^-$ is the value of the dispersive power of the lens having a negative refractive power. By constructing the third group with two lenses having a positive and a negative refractive power, respectively, and giving condition (13) to the dispersive power values of these lenses, it is possible to correct chromatic aberration well. In the third group, as previously described, the height of the incident light rays becomes greatest and the height is greatly varied with zooming and therefore, the third group is the most important group for the correction of chromatic aberration. If the third group comprises only one lens having a positive refractive power, the on-axial chromatic aberration coefficient of the entire system will be remarkably inclined toward the positive due to the chromatic aberration produced in this group and the residual chromatic aberration will vary greatly. Accordingly, it is necessary to make the third group achromatic and the correction of the chromatic aberration is made possible by constructing the third group by two lenses having a positive and a negative refractive power, respectively, and by meeting condition (13).

As regards an afocal zoom lens having a refractive power arrangement of negative, positive and negative, it is to be understood that the second group is constituted by two lenses each having a positive refractive power. In the refractive power arrangement of negative, positive and negative, the height of the incident light rays becomes highest in the second group and that height is greatly varied with zooming. Accordingly, dividing the refractive power of the second group is advantageous in correcting the aberrations. In that case, if the second group is constituted by two lenses each having a positive refractive power, the amount of spherical aberration produced will become small and good correction of the aberrations may be accomplished.

It is apparent that the above-described afocal zoom lens is equally applicable whether it is of a construction comprising a spherical lens or a construction comprising a cylindrical lens.

Examples of the numerical values of the above-described zoom lens will now be shown.

Four embodiments in which the refractive power of the three groups is positive, negative and positive and an embodiment in which the refractive power of the three groups is negative, positive and negative will be shown hereinafter. In the embodiments, r represents the curvature radii of the successive refracting surfaces, d represents the on-axial thicknesses or the air spaces of the successive lenses, n and n' represent the refractive indices of each glass material in wavelengths $0.85\mu$ and $0.6328\mu$, and $\nu d$ represents the Abbe number of each glass material.

FIGS. 3A, 4A, 5A, 6A and 7A diagrammatically show the lens cross-sections and optical paths of the respective embodiments of the afocal zoom lens at various magnifications (3 times, 6 times and 9 times), and FIGS. 3B, 4B, 5B, 6B and 7B graphically show the lateral aberrations of the respective embodiments of the afocal zoom lens at various magnifications (3 times, 6 times and 9 times).

Embodiment 1 (FIGS. 3A and B): Beam diameter magnification 1–10

$e'_1 = 12.0, e'_2 = 75.0, 1 = 110.289$ $f_1 = 18.214$
- $r_1 = 7.105$
- $r_2 = 26.020$
- $d_1 = 3.0$
- $d_2 = $ variable
- $n_1 = 1.50938, n'_1 = 1.51462$
- $\nu d_1 = 64.15$ $f_2 = -5.375$
- $r_3 = -14.477$
- $r_4 = 5.571$
- $d_3 = 2.0$
- $d_4 = $ variable
- $n_2 = 1.72079, n'_2 = 1.73541$
- $\nu d_2 = 27.79$ $f_3 = 113.839$
- $r_5 = 2243.140$
- $r_6 = 82.076$
- $r_7 = 166.081$
- $r_8 = -37.369$
- $d_5 = 40$
- $d_6 = 3.686$
- $d_7 = 5.0$
- $n_3 = 1.74048, n'_3 = 1.75607$
- $\nu d_3 = 26.55$
- $n_4 = 1.50938, n'_4 = 1.51462$
- $\nu d_4 = 64.15$ Embodiment 2 (FIGS. 4A and B): Beam diameter magnification 1–10

$e'_1 = 30.0, e'_2 = 60.0, 1 = 92.353$ $f_1 = 36.429$
- $r_1 = 30.042$
- $r_2 = -46.898$
- $d_1 = 3.0$
- $d_2 = $ variable
- $n_1 = 1.50938, n'_1 = 1.51462$
- $\nu d_1 = 64.15$ $f_2 = -4.286$
- $r_3 = -22.380$
- $r_4 = 4.095$
- $d_3 = 20$
- $d_4 = $ variable
- $n_2 = 1.78173, n'_2 = 1.79883$
- $\nu d_2 = 25.43$ $f_3 = 72.858$
- $r_5 = 1593.260$
- $r_6 = 44.207$
- $r_7 = 86.711$
- $r_8 = -24.734$
- $d_5 = 4.0$
- $d_6 = 4.065$
- $d_7 = 6.0$
- $n_3 = 1.78173, n'_3 = 1.79883$
- $\nu d_3 = 25.43$
- $n_4 = 1.54029, n'_4 = 1.54587$
- $\nu d_4 = 62.83$ Embodiment 3 (FIGS. 5A and B): Beam diameter magnification 1–10

$e'_1 = 25.0, e'_2 = 50.0, 1 = 80.178$ $f_1 = 30.357$
- $r_1 = 82.755$
- $r_2 = 18.784$
- $d_1 = 3.0$
- $d_2 = $ variable
- $n_1 = 1.50938, n'_1 = 1.51462$
- $\nu d_1 = 64.15$ $f_2 = -3.571$
- $r_3 = -5.390$
- $d_3 = 2.0$
- $n_2 = 1.78173, n'_2 = 1.79883$ -continued

| | $r_4 = 6.735$ | | $\nu d_2 = 25.43$ |
|---|---|---|---|
| | | $d_4$ = variable | |
| $f_3 = 60.711$ | $r_5 = 147.375$ | $d_5 = 5.0$ | $n_3 = 1.78173, n'_3 = 1.79883$ |
| | $r_6 = 29.793$ | | $\nu d_3 = 25.43$ |
| | | $d_6 = 3.802$ | |
| | $r_7 = 43.888$ | $d_7 = 5.854$ | $n_4 = 1.54029, n'_4 = 1.54587$ |
| | $r_8 = -24.649$ | | $\nu d_4 = 62.83$ |

Embodiment 4 (FIGS. 6A and B): Beam diameter magnification 1–10

$e'_1 = 25.0, e'_2 = 42.0, l = 71.528$

| $f_1 = 29.786$ | $r_1 = -25.391$ | $d_1 = 3.0$ | $n_1 = 1.50938, n'_1 = 1.51462$ |
|---|---|---|---|
| | $r_2 = -9.876$ | | $\nu d_1 = 64.15$ |
| | | $d_2$ = variable | |
| $f_2 = -3.000$ | $r_3 = -4.109$ | $d_3 = 2.0$ | $n_2 = 1.78173, n'_2 = 1.79883$ |
| | $r_4 = 6.636$ | | $\nu d_2 = 25.43$ |
| | | $d_4$ = variable | |
| $f_3 = 50.038$ | $r_5 = 196.208$ | $d_5 = 5.0$ | $n_3 = 1.78173, n'_3 = 1.79883$ |
| | $r_6 = 21.393$ | | $\nu d_3 = 25.43$ |
| | | $d_6 = 3.347$ | |
| | $r_7 = 37.269$ | $d_7 = 6.656$ | $n_4 = 1.54029, n'_4 = 1.54587$ |
| | $r_8 = -17.394$ | | $\nu d_4 = 62.83$ |

Embodiment 5 (FIGS. 7A and B): Beam diameter magnification 1–10

$e'_1 = 50.0, e'_2 = 165.0, l = 221.917$

| $f_1 = -18.573$ | $r_1 = 7.445$ | $d_1 = 2.0$ | $n_1 = 1.70900, n'_1 = 1.72309$ |
|---|---|---|---|
| | $r_2 = 4.226$ | | $\nu d_1 = 28.46$ |
| | | $d_2$ = variable | |
| $f_2 = 52.632$ | $r_3 = -165.603$ | $d_3 = 5.0$ | $n_2 = 1.50938, n'_2 = 1.51462$ |
| | $r_4 = -39.892$ | | $\nu d_2 = 64.15$ |
| | | $d_4 = 1.0$ | |
| | $r_5 = 94.170$ | $d_5 = 5.0$ | $n_3 = 1.50938, n'_3 = 1.51462$ |
| | $r_6 = -128.497$ | | $\nu d_3 = 64.15$ |
| | | $d_6$ = variable | |
| $f_3 = -61.315$ | $r_7 = 52.340$ | $d_7 = 5.0$ | $n_4 = 1.63295, n'_4 = 1.64379$ |
| | $r_8 = -21.460$ | | $\nu d_4 = 33.80$ |

In the embodiment, the values of the variable air spaces are as follows:

| Beam Diameter magnification | Embodiment 1 | | Embodiment 2 | | Embodiment 3 | | Embodiment 4 | | Embodiment 5 | |
|---|---|---|---|---|---|---|---|---|---|---|
| | $d_2$ | $d_4$ | $d_2$ | $d_4$ | $d_2$ | $d_4$ | $d_2$ | $d_4$ | $d_2$ | $d_4$ |
| 3 | 6.885 | 82.700 | 23.568 | 49.006 | 20.592 | 39.335 | 22.220 | 28.268 | 78.989 | 41.037 |
| 6 | 4.313 | 88.281 | 17.139 | 50.435 | 15.234 | 40.525 | 16.862 | 29.108 | 126.836 | 12.089 |
| 9 | 1.742 | 90.141 | 10.711 | 50.911 | 9.877 | 40.922 | 11.505 | 29.388 | 174.683 | 2.440 |

FIGS. 3A, 3B through 7A, 7B show the constructions and wave surface aberrations of Embodiments 1–5 at the beam diameter magnifications 3 times, 6 times and 9 times.

In the afocal zoom lens applied to the scanning device according to the present invention, a cam mechanism is necessary to move two of the three groups of lenses, and due to the manufacturing error thereof, the system can only have a performance unavoidably departing from ideal performance. With regard to the embodiments, for example, in Embodiment 3, if there is a realistic cam accuracy on the order of 20μ, the system will be ensured to have a diffraction limit performance over the entire magnification change area.

Figure 8:
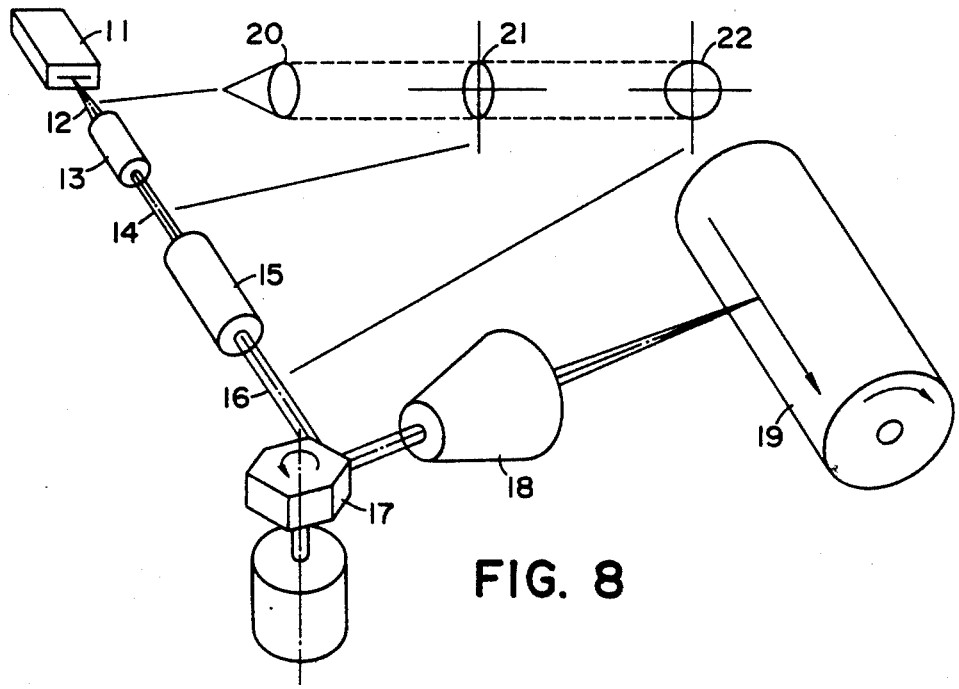
FIG. 8 shows an embodiment of the scanning recording apparatus in which the optical system according to the present invention is applied.

FIG. 8 is a schematic perspective view of an embodiment in which an optical system of the present invention is applied to a scanning device and showing a laser recording apparatus using a semiconductor laser. The light beam 12 emitted from a semiconductor laser 11 enters a collimator 13 comprising a cylindrical lens and emerges therefrom as a parallel light beam 14. The light beam 12 is a divergent light beam whose cross-sectional shape 20 is elliptical, and the light beam 14 is a parallel light beam whose cross-sectional shape 21 is elliptical. The parallel light beam 14 enters an afocal zoom expander 15 comprising a cylindrical lens and emerges therefrom as a parallel light beam 16. The afocal zoom expander 15 is arranged so as to expand only the minor axis direction of the elliptical cross-sectional shape 21 of the parallel beam 14 and imparts a suitable magnification to make the cross-sectional shape 22 of the parallel beam 16 circular. The parallel beam 16 is deflected by a rotatable polygonal mirror 17 and forms a spot on a photosensitive drum 19 through an imaging lens 18, whereby scanning and recording is effected.

By changing the magnification of the afocal zoom expander 15, it is possible to lengthen or shorten the shape of the spot in a particular direction and carry out an experiment and examination. Also, if the semiconductor laser 11 is variously varied, the cross-sectional shape 20 of the light beam 12 emitted therefrom will be varied and further, the cross-sectional shape 21 of the parallel light beam 14 will be varied. At this time, where it is desired to effect such beam shaping which always makes the cross-sectional shape 22 of the parallel light beam 16 circular, the magnification of the afocal zoom expander 15 may be changed in accordance with the cross-sectional shape of the light beam emitted from the semiconductor laser.

Which group of the afocal zoom expander 15 should be made movable and which group should be fixed may be determined by the relation between the afocal zoom expander and the optical members near it when the expander is disposed.

In the foregoing description, the afocal beam diameter changing optical system has been shown with respect to a method of use in which the beam diameter is expanded from equal magnification. However, if the system is used with the incidence direction of the light beam reversed, this beam diameter changing optical system will of course permit a method of use in which the beam diameter is reduced from equal magnification.

Figure 10:
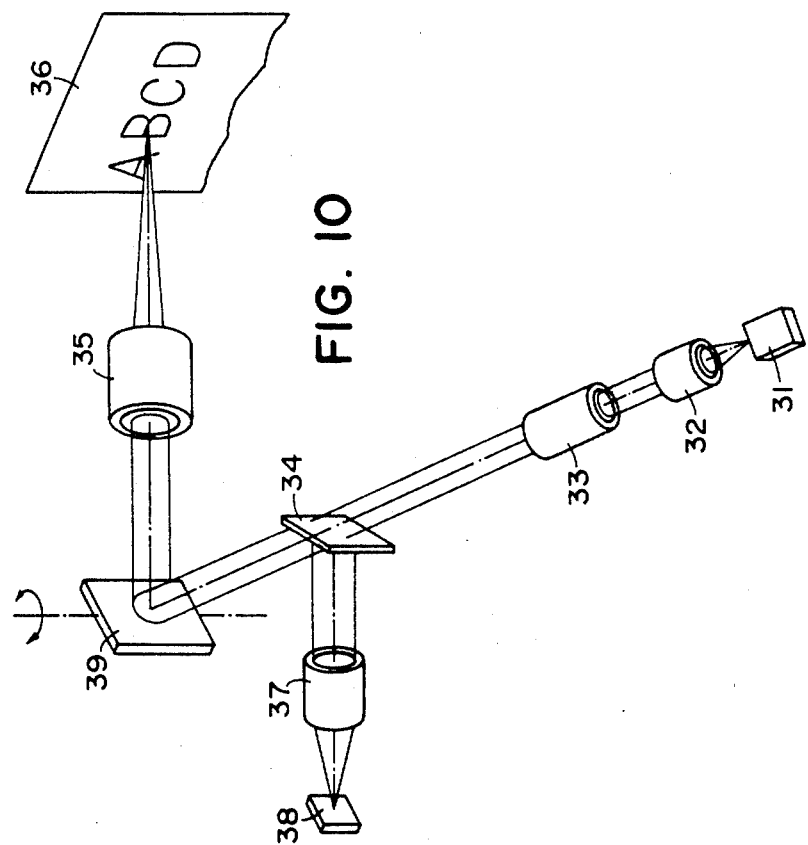
FIGS. 9 and 10 show an embodiment of the reading apparatus in which the optical system according to the present invention is applied.
Figure 9:
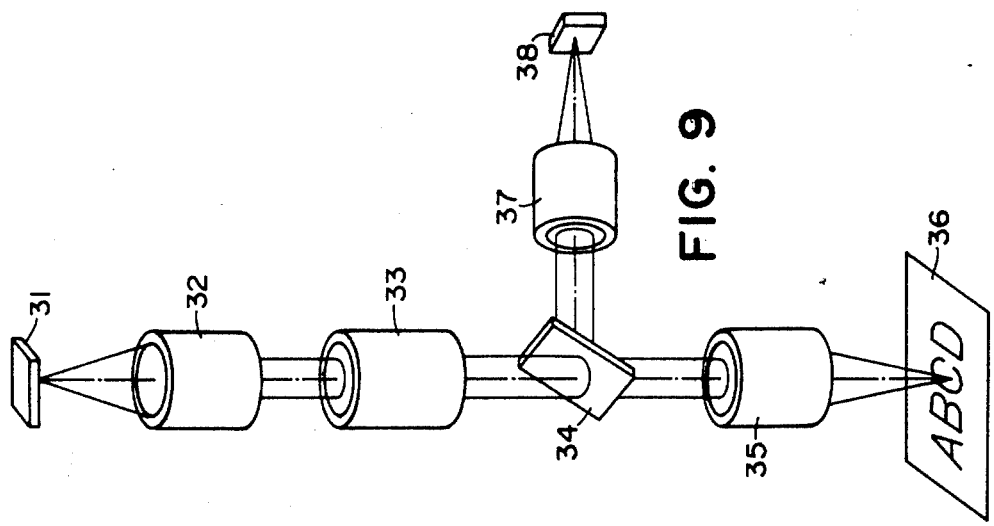

FIGS. 9 and 10 show an embodiment in which the optical system of the present invention is applied to an image information reading apparatus such as a facsimile or the like which digitalizes image information and reads the same. In FIG. 9, the light beam emitted from a light source 31 is collimated by a collimater lens 32 and the diameter of the light beam is changed by an afocal zoom lens 33. The light beam passes through a beam splitter 34, whereafter an imaging spot diameter is formed on an original image 36 by an imaging lens 35. The original image 36 irradiated with the imaging spot reflects the light beam, and the light beam again passes through the lens 35 and is directed toward a condenser 37 by the beam splitter 34 and condensed on a light receptor 38. In the reading system as shown in FIG. 9, there is also a method in which a zoom lens is used as the lens 35, but the use of an afocal zoom lens will demonstrate a greater effect in the beam scanning system shown in FIG. 10. That is, where a deflecting mirror 39 is disposed between the imaging lens 35 and the beam splitter 34, if a zoom lens is employed as the imaging lens 35, the construction of the system will become complicated. Accordingly, if the afocal zoom lens 33 for changing the beam diameter is used before the beam enters the deflecting mirror 39, the construction will be simplified. If it is attempted to obtain on the original image a spot diameter approximate to the diffraction limit, the function of the afocal zoom lens 33 is only to change the diameter of the on-axial light beam and thus, the system can be simplified in construction and demonstrate a high performance (diffraction limit). Thus, varying the diameter of the spot illuminating a recording medium having thereon information to be read, in accordance with a desired resolving power, is fit for making the reading time efficient.

What we claim is:

1. An optical system capable of continuously varying the diameter of a light beam spot, comprising:
    a light source emitting a light beam;
    a light receiving medium for receiving the light beam emitted from said light source;
    optical means disposed between said light source and said light receiving medium for directing the light beam from said light source to said light receiving medium, said optical means including means for causing the light beam to become parallel to the optical axis of said optical means in a particular area; and
    an afocal zoom lens, disposed in said area of said optical means, for continuously varying the diameter of the parallel light beam as it emerges therefrom with respect to the diameter of the parallel light beam as it is incident thereon, said afocal zoom lens comprising, from the light beam incident side to the light beam emergent side thereof, a positive first lens group, a negative second lens group and a positive third lens group satisfying the following relations:

$$0.027 < \phi_1 < 0.055$$

$$-0.34 < \phi_2 < -0.18$$

$$0.0087 < \phi_3 < 0.02$$

$$12.0 < e_1' < 30.0$$

$$42.0 < e_2' < 75.0$$

where, $\phi_1$ is the power of said first lens group, $\phi_2$ is the power of said second lens group, $\phi_3$ is the power of said third lens group, $e_1'$ is the interval between the principal point of said first lens group and the principal point of said second lens group in their initial positions, and $e_2'$ is the interval between the principal point of said second lens group and the principal point of said third lens group in their initial positions.

2. An optical system according to claim 1, wherein said third lens group comprises a positive lens and a negative lens.

3. An optical system according to claim 2, wherein $\nu_3^+ > \nu_3^-$, where $\nu_3^+$ is the dispersive power value of said positive lens and $\nu_3^-$ is the dispersive power value of said negative lens.

4. An optical system capable of continuously varying the diameter of a light beam spot, comprising:
    a light source emitting a light beam;
    a light receiving medium for receiving the light beam emitted from said light source;
    optical means disposed between said light source and said light receiving medium for directing the light beam from said light source to said light receiving medium, said optical means including means for causing the light beam to become parallel to the optical axis of said optical means in a particular area; and
    an afocal zoom lens, disposed in said area of said optical means, for continuously varying the diameter of the parallel light beam as it emerges therefrom with respect to the diameter of the parallel light beam as it is incident thereon, said afocal zoom lens comprising, from the light beam incident side to the light beam emergent side thereof, a negative first lens group, a positive second lens group, and a negative third lens group, each of said first and third lens groups consisting of a single lens, said second lens group consisting of two positive lenses, and two of said three lens groups being movable to effect zooming.

5. An optical system according to claim 1 or 4, wherein said light source emits a divergent beam and said optical means comprises a collimator lens for collimating the divergent beam emitted by said light source.

6. An optical system according to claim 1 or 4, further comprising a detector for receiving the light beam scattered by said light receiving medium, and light-collecting means for directing the light beam scattered by said light receiving means to said detector.

* * * * *